United States Patent [19]

Sano et al.

[11] Patent Number: 5,093,191

[45] Date of Patent: Mar. 3, 1992

[54] MAGNETIC RECORDING MEDIUM CONTAINING FERROMAGNETIC PARTICLES WITH SPECIFIED CRYSTALLITE SIZES AND WHEREIN THE RATIO OF CHLORINE TO IRON AT THE SURFACE IS WITHIN A SPECIFIED RANGE

[75] Inventors: Kunihiko Sano; Hiroaki Doushita; Kiyomi Ejiri; Hiroyuki Tahara, all of Kanagawa, Japan

[73] Assignee: Fuji Photo Film Co., Ltd., Kanagawa, Japan

[21] Appl. No.: 486,329

[22] Filed: Feb. 28, 1990

[30] Foreign Application Priority Data

Feb. 28, 1989 [JP] Japan ................................. 1-46846

[51] Int. Cl.$^5$ .............................................. G11B 5/00
[52] U.S. Cl. .................................... 428/323; 428/329; 428/402; 428/409; 428/424.6; 428/425.8; 428/425.9; 428/694; 428/900
[58] Field of Search ............... 428/694, 900, 329, 402, 428/323, 424.6, 425.8, 425.9, 409

[56] References Cited

U.S. PATENT DOCUMENTS

| | | | |
|---|---|---|---|
| 4,594,174 | 6/1986 | Nakayama et al. | 252/62.54 |
| 4,791,021 | 12/1988 | Honda et al. | 428/329 |
| 4,851,288 | 7/1989 | Ishikuro et al. | 428/329 |
| 4,863,793 | 9/1989 | Ogawa et al. | 428/323 |
| 4,888,212 | 12/1989 | Iida et al. | 427/130 |
| 4,904,530 | 2/1990 | Huizing et al. | 428/402 |
| 4,959,263 | 9/1990 | Aonuma et al. | 428/329 |

Primary Examiner—Merrell C. Cashion, Jr.
Assistant Examiner—Stevan A Resan
Attorney, Agent, or Firm—Sughrue, Mion, Zinn, Macpeak & Seas

[57] ABSTRACT

A magnetic recording medium is disclosed, comprising a non-magnetic support having thereon a magnetic layer comprising ferromagnetic particles and a binder containing a vinyl chloride polymer, wherein the crystallite size of the ferromagnetic particles is 250 angstrom or less, the vinyl chloride polymer is present in an amount of 20 to 50% by weight based on the binder, and an integrated intensity ratio, which is denoted by $\alpha$, of Cl-2P spectrum to Fe-2P (3/2) spectrum in the surface of the magnetic layer as measured by X-ray photoelectron spectroscopy is $0.20/1 < \alpha < 0.42/1$. The magnetic recording material exhibits excellent running property and durability and hardly causes head clogging.

12 Claims, No Drawings

MAGNETIC RECORDING MEDIUM CONTAINING FERROMAGNETIC PARTICLES WITH SPECIFIED CRYSTALLITE SIZES AND WHEREIN THE RATIO OF CHLORINE TO IRON AT THE SURFACE IS WITHIN A SPECIFIED RANGE

FIELD OF THE INVENTION

The present invention relates to a magnetic recording medium comprising a non-magnetic support having thereon a magnetic layer comprising ferromagnetic particles dispersed in a binder, and more particularly it relates to a magnetic recording medium having excellent running property and durability wherein head clogging hardly takes place.

BACKGROUND OF THE INVENTION

Generally, a magnetic recording medium comprising a non-magnetic support having thereon a magnetic layer comprising ferromagnetic particles dispersed in a binder is used as a magnetic recording medium, for example as an audio tape, a video tape, or a computer tape.

In response to recent demand for high density recording, the size of ferromagnetic particles has been decreased, the dispersibility of ferromagnetic particles increased, the surface property of a magnetic layer increased, and the packing density of ferromagnetic particles increased.

In order to increase the dispersibility of ferromagnetic particles, dispersing agents are used with magnetic coating compositions.

JP-A-61-123017 (the term "JP-A" as used herein means an unexamined published Japanese patent application) shows that a polyurethane resin containing metal sulfonates and a vinyl chloride resin are used as a binder, namely, polar groups can be introduced into a binder, thereby increasing dispersibility.

JP-A-63-98834 discloses that in order to improve the surface property of a magnetic layer a calender treatment is carried out at a higher temperature or pressure, and also the surface of a magnetic layer is ground with a grinding tool.

JP-A-63-259830 proposes that in order to provide a magnetic recording medium in which head clogging and dropouts hardly take place, the surface of a magnetic layer is polished with a polishing tape. Consequently, it turns out that the number of ferromagnetic particles decreases at the surface of the magnetic layer, with a result that dropouts and head clogging decrease. However, when the crystallite size of ferromagnetic particles becomes 250 angstroms or less, sufficient effects cannot be obtained by the above polishing methods.

Magnetic recording media for higher density recording in which electromagnetic characteristics are taken seriously are generally liable to be characterized by decreased running property and durability. Particularly, a magnetic recording medium for higher density recording is liable to significantly increase video head clogging (which means that dirt adheres to a video head, thereby lowering output).

In conclusion, there has not been provided a magnetic recording medium having excellent running property without increasing head clogging.

SUMMARY OF THE INVENTION

Accordingly, an object of the present invention is to provide a magnetic recording medium which is excellent in electromagnetic characteristics, running property, and durability, with which head clogging hardly takes place.

According to the present invention, there is provided a magnetic recording medium comprising a non-magnetic support having thereon a magnetic layer comprising ferromagnetic particles and a binder containing a vinyl chloride polymer, wherein the crystallite size of the ferromagnetic particles is 250 angstrom or less, the vinyl chloride polymer is present in an amount of 20 to 50% by weight based on the binder, and an integrated intensity ratio, which is denoted by $\alpha$, of Cl-2P spectrum to Fe-2P (3/2) spectrum in the surface of the magnetic layer as measured by X-ray photoelectron spectroscopy is $0.20/1 < \alpha < 0.42/1$.

It is preferred that the vinyl chloride polymer contains one or more epoxy rings and one or more polar groups selected from the group consisting of $-SO_3M$, $-OSO_3M$, $-PO_3M_2$, $-OPO_3M_2$, and $-CO_2M$ (wherein M represents a hydrogen atom, an alkali metal, or ammonium).

DETAILED DESCRIPTION OF THE INVENTION

The present inventors have found that most of the dirt on a video head is caused by the binder of the magnetic layer when head clogging takes place, namely, the reason why head clogging takes place is that the video head scrapes the binder from the surface of a magnetic layer, and the scraped binder adheres to the video head.

The present inventors have also found that the ratio of a vinyl chloride polymer (a binder component) to ferromagnetic particles in the surface of a magnetic layer is measured using X-ray photoelectron spectroscopy, and that the occurrence of head clogging is closely related to the above mentioned ratio, rather than ratio of the vinyl chloride polymer to ferromagnetic particles in the whole magnetic layer, and the amount of the dirt on a video head is determined by the former ratio. The present inventors have further found that the former ratio can be controlled apart from the ratio of the vinyl chloride polymer to ferromagnetic particles in the whole magnetic layer.

When an integrated intensity ratio of Cl-2P spectrum to Fe-2P (3/2) spectrum as measured by X-ray photoelectron spectroscopy (which corresponds to the ratio of the vinyl chloride polymer to ferromagnetic particles in the surface of the magnetic layer) is less than 0.42/1, the binder component contained in the surface of a magnetic layer is not scraped off by a video head, so that the video head is free from contamination. As a result, there can be obtained a magnetic recording medium in which head clogging hardly takes place. When the integrated intensity ratio of Cl-2P spectrum to Fe-2P (3/2) spectrum is 0.20/1 or less, however, the binder component contained in the surface of the magnetic layer is insufficient to act as a binder, and accordingly the surface of the magnetic layer is injured by a video head, thus lowering running durability.

The Cl-2P spectrum and Fe-2P (3/2) spectrum mean 2P spectrum of Cl and 2P (3/2) spectrum of Fe as measured by X-ray photoelectron spectroscopy, respectively. With respect to the X-ray photoelectron spectroscopy, reference can be made to Thomas A. Carlson,

*Photoelectron and Auger Spectroscopy*, p.3, PLENUM PRESS (1975).

In conventional magnetic recording media, the integrated intensity ratio ($\alpha$) of Cl-2P spectrum to Fe-2P (3/2) spectrum is 0.43/1 to 0.49/1, and head clogging takes place even when the number of passes is low and the coefficient of friction is relatively high as shown in Comparative Example 1 below. While the reason is unclear, it can be assumed that a the vinyl chloride polymer is considerably hard, and it greatly affects the durability of the magnetic layer surface which is in contact with a magnetic head. That is, an optimum ratio of the vinyl chloride polymer to ferromagnetic particles for dispersing the particles in the binder component differs from an optimum ratio of the binder component to the particles for imparting good durability to the surface of the magnetic layer.

By controlling the integrated intensity ratio ($\alpha$) of Cl-2P spectrum to Fe-2P (3/2) spectrum within the range as defind in the present invention, the ferromagnetic particles can be properly retained in the vinyl chloride polymer, and the durability of the magnetic layer surface can be increased. In addition, it is assumed that in the present invention the content of the binder component in the surface of the magnetic layer is decreased, so that an amount of a fatty acid acting as a lubricating agent to be contained in a binder decreases and much of it oozes out from the surface of the magnetic layer, thereby lowering the coefficient of friction.

When the crystallite size of ferromagnetic particles is 250 angstrom or less, it is necessary that the vinyl chloride polymer is present in an amount of 20 to 50% by weight, preferably 25 to 45% by weight, based on the total weight of the binder. In the case, a magnetic recording medium having an improved coefficient of friction and being free from the head clogging problem can be obtained if the integrated intensity ratio ($\alpha$) of Cl-2P spectrum to Fe-2P (3/2) spectrum in the surface of the magnetic layer is $0.20/1 < \alpha < 0.42/1$, preferably $0.20/1 < \alpha < 0.35/1$. As will be apparent, it is necessary to reduce the amount of the vinyl chloride polymer to a certain level when the crystallite size of ferromagnetic particles is as small as 250 angstrom or less.

The magnetic recording medium according to the present invention can be manufactured by using a vinyl chloride polymer in the specific amount and abrading the surface of the magnetic layer with, for example, a single-edged razor blade, an abrasive tape, a fixed blade, a diamond wheel, a rotary blade or the like. It is preferred that the abrasion be done by moving an abrasive tape or a rotary blade in a direction opposite to the direction to which the magnetic layer proceeds. When an abrasive tape is used, it is preferably moved at a speed of 1 to 3 cm/min with respect to the magnetic layer. It is not preferred that the abrasion time is too long or too short. It is important that abrasion is done such that the integrated intensity ratio ($\alpha$) of Cl-2P spectrum to Fe-2P (3/2) spectrum in the surface of the magnetic layer is $0.20/1 < \alpha < 0.42/1$.

Ferromagnetic particles which can be used in the present invention have a crystallite size of 250 angstrom or less as measured by X-ray diffractometry, and examples of ferromagnetic particles include ferromagnetic alloy particles, ferromagnetic iron oxide particles, Co-doped ferromagnetic iron oxide particles, ferromagnetic chromiun dioxide particles, and barium ferrite. The present invention is particularly effective in the system where ferromagnetic alloy particles are used because the ferromagnetic alloy particles are small in size and are suitable for short wavelength recording so that the resulting magnetic recording medium tends to have a smooth surface of the magnetic layer increasing the coefficient of friction and in turn, head clogging takes place easily and the recording and reproducing performance of the medium with respect to short wavelength signals is markedly deteriorated with the head clogging. Ferromagnetic alloy particles have a metal content of 75% by weight or more, and 80% by weight or more of the metal content is a ferromagnetic metal such as Fe, Co, Ni, Fe-Ni, Co-Ni, and Fe-Co-Ni.

Ferromagnetic alloy particles, ferromagnetic iron oxide particles, Co-doped ferromagnetic iron oxide particles, and ferromagnetic chromium dioxide particles generally have an acicular ratio (long axis/short axis) of about 2/1 to 20/1, preferably 5/1 or more, and of an average particle length (in the long axis) of about 0.2 to 2.0 microns.

The vinyl chloride polymer which can be used as a binder component in the present invention is a polymer containing vinyl chloride as a main monomer component, and examples thereof include vinyl chloride/vinyl acetate copolymers, vinyl chloride/vinyl propionate copolymers, vinyl chloride/vinyl alcohol/maleic acid copolymers, vinyl chloride/vinyl alcohol/acrylic acid copolymers, vinyl chloride/vinylidene acetate copolymers, and vinyl chloride/acrylonitrile copolymers.

Among these, vinyl chloride polymers such as vinyl chloride/vinyl acetate copolymers and vinyl chloride/vinyl propionate copolymers, which contains at least one polar group such as $-SO_3M$, $-OSO_3M$, $-PO_3M_2$, $-OPO_3M_2$ and $-CO_2M$ (wherein M represents a hydrogen atom, an alkali metal, or ammonium) and at least one epoxy group, are preferred. Of these polar groups, $-SO_3M$ and $-CO_2M$ are preferred, with $-SO_3M$ being particularly preferred. The content of the polar groups is $10^{-7}$ to $10^{-3}$ equivalent, particularly preferably $10^{-5}$ to $5 \times 10^{-4}$ equivalent, per 1 g of the polymer. When the content of the polar groups is outside the above range, the dispersibility of ferromagnetic particles becomes poor, and electromagnetic characteristics are reduced. One or more kinds of these polar groups may be present. The content of the epoxy groups is $10^{-4}$ to $10^{-2}$ moles, preferably $5 \times 10^{-4}$ to $5 \times 10^{-3}$ moles, per 1 g of the polymer. Further, the presence of $-OH$ groups provides increased dispersibility. The content of the OH group is preferably $10^{-4}$ to $1.5 \times 10^{-3}$ equivalent per 1 g of the polymer.

The weight average molecular weight of the polymer is 20,000 to 100,000, preferably 30,000 to 80,000. When it is out of the above range, the improvement of dispersibility is reduced. The above-noted polymer binder can be used alone or in combinations thereof.

Other resins can be added to the above binder component. Examples of such resins include cellulose derivatives such as nitrocellulose resins, ethylene/vinyl acetate copolymers, acrylic resins, polyvinyl acetal resins, polyvinyl butyral resins, epoxy resins, phenoxy resins, and polyurethane resins.

In the present invention, polyurethane resins are preferably used with the vinyl chloride polymer, and polyester polyurethane resins, polyether polyurethane resins and polycarbonate polyurethane resins are particularly preferred. The polyurethane resins can be produced by reacting a polyol, a polyisocyanate and a branched crosslinking agent, and if desired a chain-extender, in a conventional manner.

Examples of polyols include polyether polyols, polyester polyols, polycarbonate polyols, and polycaprolactone diols. Representative polyether polyols are polyalkylene glycols such as polyethylene glycol, polypropylene glycol and polytetramethylene glycol. Polyester polyols can be produced, for example, by polycondensation of a dihydric alcohol such as glycols (e.g., ethylene glycol, propylene glycol, butanediol, 1,6-hexanediol and cyclohexanedimethanol) and a dibasic acid, (e.g., adipic acid, azelaic acid, sebacic acid, fumaric acid, itaconic acid, phthalic acid, isophthalic acid and terephthalic acid), open-chain polymerization of lactones (e.g., caprolactones), and the like. Preferred polycarbonate polyols include those having a molecular weight of 300 to 20,000 and a hydroxyl value of 20 to 300 which are synthesized, for example, by condensation or ester interchange reaction of phosgene, a chloroformate, a dialkyl carbonate or a diaryl carbonate with a polyhydric alcohol represented by formula (I)

$$HO-R^1-OH \qquad (I)$$

wherein $R^1$ represents $-(CH_2)_n-(n=3 \text{ to } 14)$,

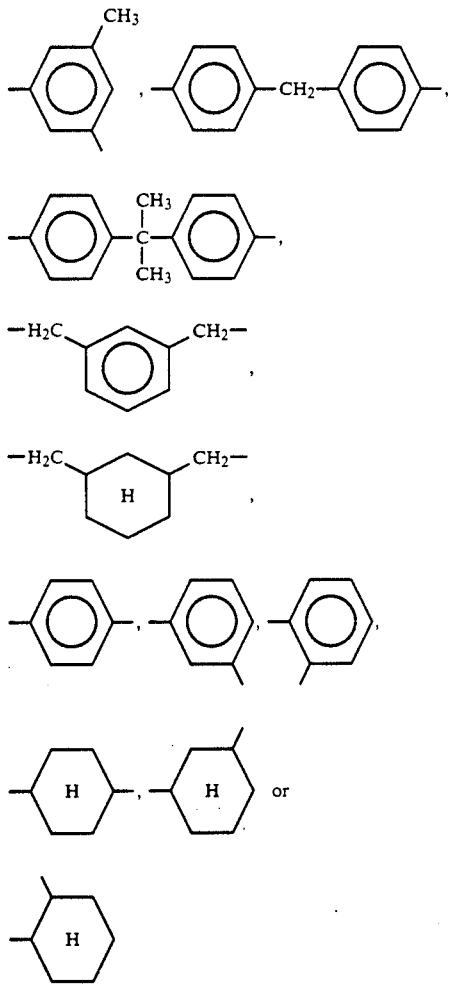

; and polycarbonate polyester polyols having a molecular weight of 400 to 30,000 and a hydroxyl valve of 5 to 300 which are synthesized by condensation of the above polycarbonate polyols with a dibasic carboxyl acid represented by formula (II)

$$HOOC-R^2-COOH \qquad (II)$$

wherein $R^2$ represents an alkylene group having 3 to 6 carbon atoms, 1,4-phenylene group, 1,3-phenylene group, 1,2-phenylene group, 1,4-cyclohexylene group, 1,3-cyclohexylene group, or 1,2-cyclohexylene group. Polyesterether polyols and polyesters may be compounded together with the above polyols in an amount of 90% by weight or less based on the weight of the polyols.

Polyisocyanates which are reacted with the polyols are not particularly limited, and those conventionally used for the production of polyurethane resins can be used, such as hexamethylene diisocyanate, tolylene diisocyanate, isophorone diisocyanate, 1,3-xylylene diisocyanate, 1,4-xylylene diisocyanate, cyclohexane diisocyanate, toluidine diisocyanate, 2,4-tolylene diisocyanate, 2,6-tolylene diisocyanate, 4,4'-diphenylmethane diisocyanate, p-phenylene diisocyanate, m-phenylene diisocyanate, 1,5-naphthylene diisocyanate, 4,4-diphenylmethane diisocyanate, 3,3-dimethylphenylene diisocyanate, and dicyclohexylmethane diisocyanate.

For the branched crosslinking agent, there may be mentioned polyhydric alcohols having three or more functional groups, such as trimethylolpropane, glycerol, hexanetriol, triethanolamine, diglycerol, pentaerythritol, sorbitol, dipentaerythritol, ethylene oxide or propylene oxide adducts of the above compounds, and propylene oxide adducts of ethylenediamine. Of the branched crosslinking agents, those having three hydroxyl groups per molecule are preferred, such as trimethylolpropane and glycerol. The amount of the branched crosslinking agent is generally from 0.1 to 1 mmol per 1 g of polyurethane resins. If the amount is more than 1 mmol/g, solubility of the resulting polyurethane resins is reduced. If it is less than 0.1 mmol/g, properties of the resins are deteriorated with respect to dispersibility, durability and calendering contamination.

While the above-mentioned polyhydric alcohols may function as a chain extender, aliphalic polyamines, alicyclic polyamines and aromatic polyamines may also be used for the purpose.

In the binder as described above, conventional isocyanate type crosslinking agents may be added as a binder component to cure the binder. The isocyanate type crosslinking agents used in the present invention are polyisocyanate compounds having two or more isocyanate groups, such as isocyanates (e.g., tolylene diisocyanate, 4,4'-diphenylmethane diisocyanate, hexamethylene diisocynate, xylylene diisocyanate, naphthylene-1,5-diisocyanate, o-toluidine diisocyanate, isophorone diisocyanate, triphenylmethane diisocyanate, reaction products of these isocyanates and polyols (e.g., an adduct of three molsof tolylene diisocyanate and one mol of trimethylolpropane), and polyisocyanates produced by condensation of these isocyanates. These polyisocyanate compounds are commercially available under the trade marks, Coronate L, Coronate HL, Coronate H, Coronate EH, Coronate 2014, Coronate 2030, Coronate 2031, Coronate 2036, Coronate 3015, Coronate 3040, Coronate 3041, Millionate MR, Millionate MTL, Daltosec 1350, Daltosec 2170 and Daltosec 2280 (produced by Nippon Polyurethane Co., Ltd.), Takenate D102, Takenate D110N, Takenate D200 and Takenate D202 (produced by Takeda Pharmaceutical Industries Co., Ltd.), Sumidule N75(produced by Sumitomo Bayer Co., Ltd.), Desmodule L, Desmodule IL, Desmodule N and Desmodule HL (preduced by Bayer A.G.), and Burnock D850 and Burnock D802 (produced by DAI-NIPPON INK AND CHEMICAL INC.)

Acrylic ester oligomers and acrylic ester monomers may also be added as a binder component to make the binder curable by irradiation.

A preferred binder used in the present invention comprises a vinyl chloride polymer, a polyurethane resin, and a curing agent such as the isocyanate type crosslinking agents, wherein the vinyl chloride polymer, the polyurethane resin and the curing agent are contained in amounts of 20 to 50 parts by weight, 20 to 50 parts by weight and 10 to 40 parts by weight, respectively, based on 100 parts by weight of the total amount of the three components.

The content of the whole binder in the magnetic layer is generally 10 to 100 parts by weight, preferably 20 to 50 parts by weight, per 100 parts by weight of the ferromagnetic particles.

A preferred method for manufacturing a magnetic recording medium using such ferromagnetic particles and binders, etc., will be described as follows.

Since ferromagnetic particles aggregate secondarily due to their own magnetic properties, it is preferred that they are mechanically pulverized. The introduction of this pulverizing step shortens the time for the next kneading step.

The pulverizing step can be conducted using a simple mill (produced by Shinto Kogyo Co.,Ltd.), a sand mill (produced by Matsumoto Chuzo Kogyo Co.,Ltd.), a sand grinder, a two-rod roll mill, a three-rod roll mill, an open-kneader, a pressure-kneader, a continuous kneader, and a Henschel mixer, etc. It is desirable that the pulverizing step is conducted using the same apparatus as that used in the next kneading step since a transfer step can be omitted.

In a kneading step and a dispersing step, the binder, the ferromagnetic particles and solvents are mixed and kneaded using the above roll mills or kneaders, followed by dispersing. When a dispersing step is carried out, a sand mill, a ball mill, an attritor, and a Henschel mixer, etc., can be used. In this case, the binder may be dissolved in solvents, or the binder and solvent may be used separately.

Lubricating agents may be added to the magnetic coating composition used in the present invention. Examples of the lubricating agents include fatty acids having 12 to 24 carbon atoms, fatty acid esters (e.g., various monoesters, sorbitan fatty acid esters, glycerol fatty acid esters, polybasic acid esters), fatty acid amides, metallic soaps, higher aliphatic alcohols, monoalkyl phosphates, dialkyl phosphates, trialkyl phosphates, paraffins, silicone oils, silicone compounds denatured by fatty acids, fluorine oils, esters having perfluoroalkyl group, silicone compounds having perfluoroalkyl group, animal oils, vegetable oils, mineral oils, higher aliphatic amines, and inorganic particles (e.g., graphite, silica, molybdenum disulfide, tungsten disulfide). Among these, fatty acids having 14 to 22 carbon atoms, fatty acid amides having 14 to 22 carbon atoms, fatty acid esters having 22 to 36 carbon atoms, esters having perfluoroalkyl groups of 6 or more carbon atoms, and silicone compounds having perfluoroalkyl groups of 6 or more carbon atoms are preferred.

Additives such as abrasive agents, dispersing agents, antistatic agents, or rust preventives may be further added to the magnetic coating composition used in the present invention.

The abrasive agents are not particularly limited, and those having a Moh's hardness of 5 or higher, preferably 8 or higher are used. Examples thereof include $Al_2O_3$ (Moh's hardness: 9), TiO (Moh's hardness: 6), $TiO_2$ (Moh's hardness: 6.5), $SiO_2$ (Moh's hardness: 7), $SnO_2$ (Moh'ss hardness: 6.5), $Cr_2O_3$ (Moh's hardness: 9), and $\alpha$-$Fe_2O_3$ (Moh's hardness: 5.5). These abrasive agents can be used alone or in combination. Particularly preferred are those having a Moh,s hardness of 8 or higher. When abrasive agents having a Moh,s hardness of less than 5 are used, they are liable to drop out from the magnetic layer, thus lowering running durability.

The content of the abrasive agents is generally 0.1 to 20 parts by weight, preferably 1 to 10 parts by weight, per 100 parts by weight of ferromagnetic particles.

It is preferred that carbon black, the average particle size of which is 10 to 300 nm, is used as an antistatic agent.

Organic solvents which can be used for forming the magnetic coating composition include ketones such as acetone, methyl ethyl ketone, methyl isobutyl ketone, or cyclohexanone; esters such as methyl acetate, ethyl acetate, butyl acetate, ethyl lactate, or glycol acetate monoethyl ether; ethers such as ethyl ether, glycol dimethyl ether, glycol monoethyl ether, dioxane, tetrahydrofuran; aromatic hydrocarbons such as benzene, toluene, or xylene; and chlorinated hydrocarbons such as methylene chloride, ethylene chloride, carbon tetrachloride, chloroform, ethylene chlorohydrin or dichlorobenzene.

The support on which a magnetic coating composition is coated can be made from materials such as polyesters (e.g., polyethylene terephthalate and polyethylene 2,6-naphthalate), polyolefins (e.g., polyethylene and polypropylene), cellulose derivatives (e.g., cellulose triacetate), polycarbonate resins, polyimide resins, polyamide-imide resins, non-magnetic metals (e.g., aluminum, copper, tin, zinc, or alloys thereof), and plastics which are coated by evaporated metals such as aluminum.

The support is generally 3 to 100 microns thick. For example, when it is a magnetic tape, it is generally 3 to 20 microns thick; and when it is a magnetic disk, it is generally 20 to 100 microns thick. As the support, any shapes such as a tape, a sheet, a disk, a card, a drum or the like can be used, if necessary.

Further, in the present invention a backing layer may be formed on the opposite surface of the support in order that charge can be prevented, wow and flutter can be prevented, strength can be increased, and the opposite surface of the support can be matted.

The present invention will be illustrated in more detail by the following Examples. In all Examples, all parts are by weight.

EXAMPLE 1

Using an open kneader 100 parts of ferromagnetic alloy particles (composition: Fe 94%, Zn 4%, Ni 2%, Hc: 1500 Oe, crystallite size: 200 angstrom) were ground for 10 minutes, and were mixed and kneaded for 60 minutes with 60 parts of methyl ethyl ketone and 10 parts of an adduct ($SO_3Na = 6 \times 10^{-5}$eq/g, epoxy $= 10^{-3}$eq/g, molecular weight: 30,000) of a vinyl chloride/vinyl acetate/glycidylmethacrylate copolymer (86/9/5 by weight) and sodium hydroxyethyl sulfonate.

To the thus formed mixture were added 8 parts (as a solid) of a urethane resin containing —$SO_3Na$ group ("UR8200", produced by Toyobo Co., Ltd.), 5 parts of an abrasive agent (Al$_2$O$_3$ having a particle size of 0.3 microns), 2 parts of carbon black having a particle size of 40 mμ, and 200 parts of a methyl ethyl ketone/toluene mixture (1/1 by weight), and thereafter it was dispersed for 120 minutes using a sand mill.

To the thus formed dispersion were further added 8 parts (as a solid) of polyisocyanate ("Coronate 3041", produced by Nippon Polyurethane Co., Ltd.), 1 part of stearic acid, 2 parts of butyl stearate and 50 parts of methyl ethyl ketone, and then it was further mixed and kneaded for 20 minutes followed by filtration using a filter having an average pore diameter of 1 μ, whereby a magnetic coating composition was prepared.

The magnetic coating composition was coated, using a reverse roll, on a 10 μ-thick polyethylene terephthalate support in a dry thickness of 3.0 μ.

The support thus coated with the magnetic coating composition was subjected to magnetic orientation with magnets of 3000 gauss while the magnetic coating composition was wet. It was then dried, subjected to super calendering treatment and slit to a 8 mm width.

Finally, an ordinary single-edged razor blade (produced by Shick Co., Ltd.) was moved at a rate of 2 m/min along the longitudinal direction of the slit support to which 100 g of tension was applied in both the releasing side and taking-up side of the support while the razor blade was pressed onto the surface of the magnetic layer at a right angle to depress the contacted portion of the support down by 0.1 μ (hereinafter referred to as a razor treatment). The razor treatment was repeated 10 times to produce a 8 mm video tape.

EXAMPLE 2

The same procedure as in Example 1 was repeated to prepare a 8 mm video tape, except that a razor treatment was repeated 5 times instead of 10 times.

EXAMPLE 3

The same procedure as in Example 1 was repeated to prepare a 8 mm video tape, except that the vinyl chloride/vinyl acetate/glycidyl methacrylate copolymer (86/9/5 by weight) was used as it is instead of the adduct thereof.

EXAMPLE 4

The same procedure as in Example 2 was repeated to prepare a 8 mm video tape, except that the vinyl chloride/vinyl acetate/glycidylmethacrylate copolymer (86/9/5 by weight) was used as it is instead of the adduct thereof.

EXAMPLE 5

The same procedure as in Example 1 was repeated to prepare a 8 mm video tape, except that Co-containing γ-iron oxide (Hc: 900 Oe, crystallite size: 250 angstrom) was used as ferromagnetic particles.

COMPARATIVE EXAMPLE 1

The same procedure as in Example 1 was repeated to prepare a 8 mm video tape, except that a razor treatment was not carried out.

COMPARATIVE EXAMPLE 2

The same procedure as in Example 3 was repeated to prepare a 8 mm video tape, except that a razor treatment was not carried out.

COMPARATIVE EXAMPLE 3

The same procedure as in Example 2 was repeated to prepare a 8 mm video tape, except that a razor treatment was repeated 20 times.

The video tapes thus obtained were evaluated in the following manner and the results shown in Table 1.

Evaluation for head clogging

Video tapes thus obtained were mounted on a VTR ("FUJIX-8", produced by Fuji Photo Film Co., Ltd.), and the tapes of whole length (for 120 minute-recording) were repeatedly run at 25° C., 70% RH, and the number of passes at which head clogging takes place was measured. In this instance, head clogging means that a reproduced output continues at a lowering of more than 6 dB for more than one minute. However, the running test was not continued in the case that the head clogging did not take place even after 100 passes. The video tape used in Example 5 below had a ½ inch width and was mounted on a VTR of S-VHS type ("AG 6200", produced by Matsushita Electric Industrial Co., Ltd.).

While video tapes were run up to 100 passes in this evaluation, it is generally accepted that if head clogging does not take place within 50 passes, such tapes have practically no problems.

Method for measuring α

A device for X-ray photoelectron spectroscopy (PHI-560, produced by PERKIN-ELMER CO.) was used for measuring α. Sources of X-ray were Mg anode of 300 W. Lubricating agents for video tapes were washed away with n-hexane, and then the video tapes were mounted on the above device. The distance between sources of X-ray and samples was made to be 1 cm. After samples were outgassed under vacuum for 5 minutes, Cl-2P spectrum and Fe-2P (3/2) spectrum were measured by integrating them for 10 minutes. A pass energy was made constant at 100 eV.

An integrated intensity ratio of Cl-2P spectrum to Fe-2P (3/2) spectrum as measured was calculated as α.

Dynamic coefficient of friction

A sample tape was hung on a yttrium alloy drum having a diameter of 115.8 mm, the surface of which was polished. Load $W_o$ was applied to one end of the sample tape, while a tension detector was attached to the other end thereof, so that tension W was measured. The sample tape was rubbed at a relative speed of 19.0 cm/sec by rotating the drum at 31.4 rpm.

The dynamic coefficient of friction was calculated by the following equation:

$$\text{Dynamic coefficient of friction } (\mu) = \frac{1}{\pi} \ln \frac{W}{W_0}$$

TABLE 1

|  | α | Number of passes at which head clogging takes place | Dynamic coefficient of friction |
| --- | --- | --- | --- |
| Example 1 | 0.25/1 | more than 100 passes | 0.26 |
| Example 2 | 0.34/1 | 67 passes | 0.25 |
| Example 3 | 0.31/1 | 82 passes | 0.26 |
| Example 4 | 0.39/1 | 53 passes | 0.24 |
| Example 5 | 0.41/1 | 56 passes | 0.25 |
| Comparative Example 1 | 0.48/1 | 35 passes | 0.31 |

TABLE 1-continued

| | α | Number of passes at which head clogging takes place | Dynamic coefficient of friction |
|---|---|---|---|
| Comparative Example 2 | 0.50/1 | 27 passes | 0.30 |
| Comparative Example 3 | 0.18/1 | 2 passes | 0.45 |

(α: an integrated intensity ratio of Cl-2P spectrum to Fe-2P (3/2) spectrum as measured by X-ray photoelectron spectroscopy.)

It can be seen that the magnetic recording medium according to the present invention exhibits good characteristics in running property, durability and stability in dynamic coefficient of friction, and causing less head clogging.

While the invention has been described in detail and with reference to specific embodiments thereof, it will be apparent to one skilled in the art that various changes and modifications can be made therein without departing from the spirit and scope thereof.

What is claimed is:

1. A magnetic recoridng medium comprising a non-magnetic support having thereon a magnetic layer comprising ferromagnetic particles and a binder containing a vinyl chloride polymer, wherein sad vinyl chloride polymer contains at least one polar group in amount of $10^{-7}$ to $10^{-3}$ equivalent per one gram of said vinyl chloride polymer, wherein crystallite size of said ferromagnetic particles is 250 angstrom or less, said vinyl chloride polymer is present in an amount of 20 to 50% by weight based on said biner, and a binder layer in a surface portion of said layer is abraded to attain an integrated intensity ratio, which is denoted by α, of Cl-2P spectrum to Fe-2P (3/2) spectrum in the surface of said magnetic layer as measured by X-ray photoelectron spectroscopy of $0.20/1 < \alpha < 0.42/1$.

2. The magnetic recoridng medium according to claim 1, wherein said vinyl chloride polymer contains at least one epoxy ring and said at least one polar group is selected from the group consisting of —SO$_3$M, —OSO$_3$M, —PO$_3$M$_2$, —OPO$_3$M$_2$, and —CO$_2$M wherein M represents a hydrogen atom, an alkali metal, or ammonium.

3. The magnetic recording medium according to claim 1, wherein said vinyl chloride polymer is present in an amount of 25 to 45% by weight based on said binder.

4. The magnetic recording medium according to claim 1, wherein said ferromagnetic particles are selected from the group consisting of ferromagnetic alloy particles, ferromagnetic iron oxide particles, Co-doped ferromagnetic iron oxide particles, ferromagnetic chromium dioxide particles and barium ferrite particles.

5. The magnetic recording medium according to claim 4, wherein said ferromagnetic particles are ferromagnetic alloy particles.

6. The magnetic recording medium according to claim 1, wherein said ferromagnetic particles have an acicular ratio of about 2/1 to 20/1 and an average particles length of about 0.2 to 2.0 microns.

7. The magnetic recording medium according to claim 6, wherein said acicular ratio is 5/1 or more.

8. The magnetic recording medium according to claim 1, wherein said vinyl chloride polymer is a vinyl chloride copolymer.

9. The magnetic recording medium according to claim 8, wherein said vinyl chloride copolymer is selected from the group consisting of vinyl chloride/vinyl acetate copolymers, vinyl chloride/vinyl propionate copolymers, vinyl chloride/vinyl alcohol/maleic acid copolymers, vinyl chloride/vinyl alcohol/acrylic acid copolymers, vinyl chloride/vinylidene acetate copolymers, and vinyl chloride/acrylonitrile copolymers.

10. The magnetic recording medium according to claim 2, wherein the content of the epoxy groups is $10^{-4}$ to $10^{-2}$ moles per one gram of the vinyl chloride polymer.

11. The magnetic recording medium according to claim 1, wherein the weight average molecular weight of said vinyl chloride polymer is 20,000 to 100,000.

12. The magnetic recording medium according to claim 1, wherein the binder comprises a vinyl chloride resin, a polyurethane resin and a curing agent in amounts of 20 to 50 parts by weight, 20 to 50 parts by weight and 10 to 40 parts by weight, respectively, based on 100 parts by weight of the total amount of the above three components.

* * * * *